United States Patent [19]
Ikeda

[11] Patent Number: 5,829,735
[45] Date of Patent: Nov. 3, 1998

[54] DISC VALVE

[75] Inventor: Yasushi Ikeda, Gamo-gun, Japan

[73] Assignee: Kyocera Corporation, Kyoto, Japan

[21] Appl. No.: 839,056

[22] Filed: Apr. 23, 1997

[30] Foreign Application Priority Data

Apr. 26, 1996 [JP] Japan .................................. 8-108125

[51] Int. Cl.⁶ .................................................. F16K 31/00
[52] U.S. Cl. ................ 251/368; 137/625.17; 137/625.41
[58] Field of Search .................... 137/625.17, 625.41; 251/368

[56] References Cited

U.S. PATENT DOCUMENTS

| | | | |
|---|---|---|---|
| 4,763,876 | 8/1988 | Olda et al. .............................. | 251/368 |
| 4,932,438 | 6/1990 | Kitamura et al. ................... | 137/625.41 |
| 5,100,565 | 3/1992 | Fujiwara et al. .................... | 137/625.41 |
| 5,755,261 | 5/1998 | Fukuzawaw et al. .................. | 251/368 |

*Primary Examiner*—A. Michael Chambers
*Attorney, Agent, or Firm*—Loeb & Loeb LLP

[57] ABSTRACT

The present invention provides a disc valve capable of enhancing an adhesion force between a valve body and a diamond-like hard carbon film so as to maintain leak-free and stable sliding characteristics for an extended period of time.

The disc valve of the present invention comprises two valve bodies which slide with each other, wherein at least one of the valve bodies is made of ceramics, and the surface of the valve body is coated with a diamond-like hard carbon film through an intermediate layer comprising a Ti film and a Si film laminated in this order.

6 Claims, 2 Drawing Sheets

DISC VALVE

TECHNICAL FIELD

The present invention relates to a disc valve comprising a movable valve body and a stationary valve body, which is used for water faucets and water/hot-water mixture faucets, such as single lever mixture faucets and thermostat mixture faucets, as well as medical sampling valves, chemical liquid valves and the like.

PRIOR ART

Disc valves have been used for water faucets, water/hot-water mixture faucets, medical sampling valves, chemical liquid valves and the like. In such a disc valve, two disc-like valve bodies are moved to slide with each other while they are made contact with each other, thereby opening/closing a liquid passage formed in each valve body. Since this kind of disc valve is used in a condition that the sliding contact surfaces thereof rub against each other all the time, the movable valve body and the stationary valve body constituting the disc valve are made of a metal or ceramics excellent in wear resistance and corrosion resistance.

Furthermore, in the above-mentioned disc valve, a lubricant, such as grease, is used between the sliding contact surfaces to reduce the force required to operate the valve bodies.

However, in the case of the disc valve lubricated with a lubricant, the lubricant applied between the sliding contact surfaces flows out in a relatively short period of time because of the mutual sliding of the valve bodies, so that the disc valve is put in non-lubrication condition. As a result, unsmooth operation or unusual noise may occur at the sliding contact surfaces. Consequently, the force for operating the lever of the valve may increase gradually, eventually causing the problem of linking wherein the two valve bodies are stuck to each other and seized. In addition, some kinds of lubricants may deteriorate during use for an extended period of time, and may catch dust, thereby lowering the sliding characteristic of the valve bodies. Furthermore, if the lubricant flows out during water discharge, the lubricant may become harmful to human beings.

Recently, a disc valve was proposed (refer to Japanese Laid-open Patent Application No. 3-223190). This disc valve is characterized in that the surface of at least one of the valve bodies sliding with each other is coated with a diamond-like hard carbon film having a self-lubrication characteristic and being excellent in wear resistance.

However, since the adhesion of the diamond-like hard carbon film to metals and ceramics constituting the valve bodies is not very strong, the valve body of a type of disc valve is made slightly rougher so that the diamond-like hard carbon film makes closer contact with the valve body by virtue of the anchor effect. Even in this type of disc valve, water leakage may occur if the disc valve has a small sealing area.

In the case of a disc valve provided with a water purifier, just as in the case of a water faucet, a water/hot-water faucet or the like, a slight clearance may be formed between the sliding contact surfaces by increased water pressure in such a faucet, and water leakage may occur. To solve this problem, the sliding contact surfaces of the valve bodies are required to be made smooth, and the pressure exerted between the valve bodies is required to be increased. When an attempt is made to smoothen the surface of the diamond-like hard carbon film constituting the sliding contact surface, the surface of the valve body must be smooth. As a result, the diamond-like hard carbon film may be peeled.

It is an object of the present invention to improve the adhesion of a diamond-like hard carbon film used as a sliding contact surface formed on the surface of a valve body to ceramics and thereby to prevent the diamond-like hard carbon film from peeling.

It is another object of the present invention to provide a disc valve which can ensure the surface smoothness of a diamond-like hard carbon film as a sliding contact surface, and prevent water leakage thereby.

It is a further object of the present invention to provide a disc valve which permits easy sliding free from linking in a non-lubrication condition by applying a diamond-like hard carbon film on the sliding contact surface of the valve.

SUMMARY OF THE INVENTION

The present invention provides a disc valve comprising two valve bodies sliding with each other, wherein at least one of the valve bodies is made of ceramics, and an intermediate layer, which is highly adhesive to both ceramics and a diamond-like hard carbon film, is disposed between the ceramics and the diamond-like hard carbon film forming a sliding surface, so as to prevent the diamond-like hard carbon film from peeling.

More specifically, a Ti film is applied to the surface of the valve body made of ceramics, and a Si film is formed on the Ti film; the Ti film and the Si film constitute an intermediate layer. A diamond-like hard carbon film is then formed on the Si film.

In the present invention, the surface roughness of the diamond-like hard carbon film used as a sliding contact surface is maintained at a certain value or less so as to prevent water leakage from the sliding surface. For this purpose, the thickness of the intermediate layer, the thickness of the diamond-like hard carbon film and the total thickness of the layer and the film are restricted, so that the smoothness of the polished ceramic surface is maintained on the sliding contact surface of the diamond-like hard carbon film. The surface smoothness maintained can prevent water leakage from between the sliding contact surfaces of the valve bodies, and can also prevent linking at the sliding contact surfaces during a non-lubrication period.

BRIEF DESCRIPTION OF THE DRAWINGS

The present invention will be described in detail referring to the following drawings.

EMBODIMENT

The disc valve of the present invention usually comprises a stationary valve body and a movable valve body. These two valve bodies are made slidable via the sliding surfaces thereof. An intermediate layer and a diamond-like hard carbon film are formed on one of the valve bodies.

Figure 1:
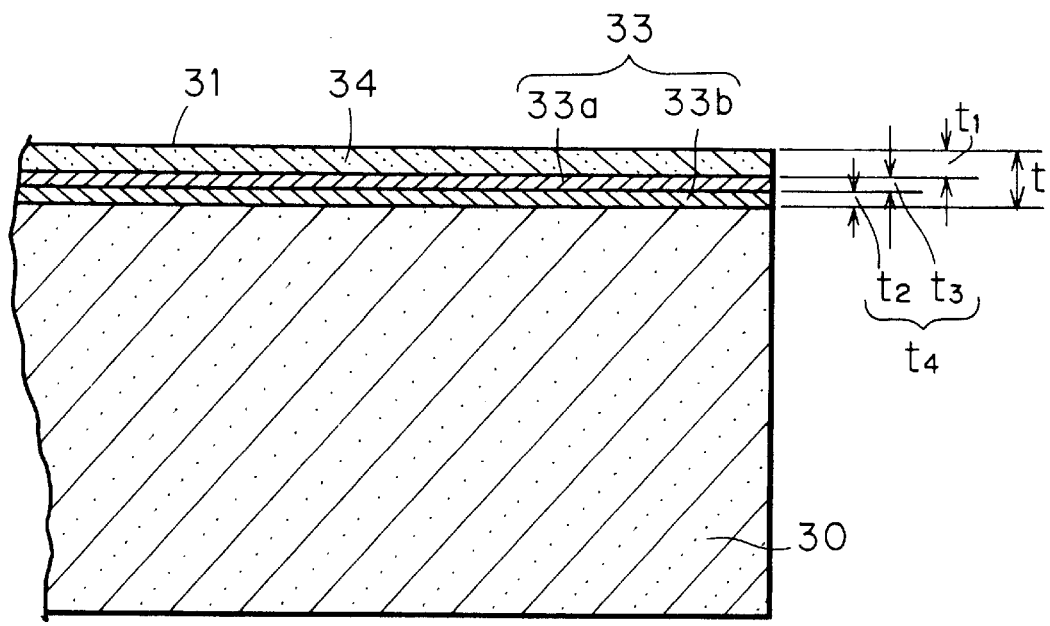
FIG. 1 is a partially sectional view showing a ceramic valve body having an intermediate layer and a diamond-like hard carbon film formed on its surface.

In the following descriptions, it is assumed that the valve body on which the diamond-like hard carbon film is formed is a stationary valve body 30. Referring to FIG. 1, the stationary valve body 30 is made of ceramics, and a Ti film 33a and a Si film 33b are laminated in this order on the surface 35 of the valve body 30, that is, on the ceramic surface so as to form an intermediate layer 33. A diamond-like hard carbon film 34 is coated on the Si-film 33b of the intermediate layer 33. The surface of the diamond-like hard carbon film 34 faces the movable valve body 2 and serves as a sliding surface 31 mutually sliding on the surface of the movable valve body 2.

The valve body 30 having the diamond-like hard carbon film is required to be made of ceramics. Since ceramics has a high hardness, the valve body 30 is hardly deformed even when the sliding surface thereof undergoes high pressure from the other valve body. Therefore, the use of ceramics is effective in preventing the intermediate layer 33 and the diamond-like hard carbon film 34 on the ceramic surface from being damaged or peeled.

Furthermore, in the present invention, when the diamond-like hard carbon film 34 is formed, the intermediate layer 33 comprising the Ti film 33a having a large junction force to ceramics and the Si film 33b having a large junction force to the diamond-like hard carbon film 34 is used instead of forming unevenness on a conventional ceramic surface and then forming the diamond-like hard carbon film 34 utilizing the anchor effect. Therefore, the ceramic surface can be made smooth. Consequently, there is an advantage that the diamond-like hard carbon film 34 can be made smooth.

The intermediate layer 33 is detailed below. The Ti film 33a formed on the surface 35 of the stationary valve body 30 has a thermal expansion coefficient of about $8.4 \times 10^{-6}/°C$. which is not so different from the thermal expansion coefficient of the ceramics constituting the stationary valve body 30. In addition, the Ti film 33a has a high coefficient of diffusion to substances. Because of these reasons, the Ti film 33a can be put into a firm close contact with the stationary valve body 30 and the Si film 33b. Furthermore, since the thermal expansion coefficient of the Si film 33b is approximate to that ($3.2 \times 10^{-6}/°C$.) of the diamond-like hard carbon film 34, the Si film 33b can ensure the adhesion to the diamond-like hard carbon film 34 more firmly.

As the intermediate layer 33, there is preferably used a thin two-film layer comprising the Ti film 33a first deposited from a vapor phase and the Si film 33b deposited thereafter on the Ti film 33a from a vapor phase, said thin two-film layer being formed on the surface of ceramics constituting the stationary valve body 30. Thus, a thin layer having a controlled thickness can be obtained. The Physical Vapor Deposition (PVD) method or the Chemical Vapor Deposition (CVD) method is used as the method of forming the films as will be described below.

The thickness $t_4$ of the intermediate layer 33 is an important factor to firmly junction and support the diamond-like hard carbon film 34. Both the thickness $t_2$ of the Ti film 33a and the thickness $t_3$ of the Si film 33b are required to be 0.15 µm or more. If the thickness is 0.15 µm or less, the Ti film 33a and the Si film 33b are too thin to have uniform film thicknesses. The total thickness $t_4$ of the intermediate layer 33 should preferably be 0.8 µm or less. If the total thickness is more than 0.8 µm, the intermediate layer 33 may be deformed by the pressure from the other valve body, that is, the movable valve body 20 of this embodiment, and the diamond-like hard carbon film 34 thereon may be damaged.

The diamond-like hard carbon film 34 is formed on the Si film 33b of the intermediate layer 33 to provide a sliding surface having an extremely high surface hardness.

The diamond-like hard carbon film 34 means a hard amorphous carbon film. A diamond-like carbon film (DLC) is taken as a typical example thereof, and hard amorphous carbon films containing other metal elements can also be taken as such examples.

A diamond-like carbon film is formed substantially of carbons, and it may contain a small amount of crystalline substances. However, the diamond-like carbon film is basically amorphous and has a composition different from diamond, cubic boron nitride (cBN) and hexagonal boron nitride (hBN) having regular crystalline structures. When this diamond-like carbon film is examined by using a Raman Spectroscopic Analyzer which is occasionally used for identifying graphite and diamond, peaks are found in the vicinity of a wavenumber of 13333 $cm^{-1}$, that is, the Raman ray peak position for diamond, and in the vicinity of a wavenumber of 1550 $cm^{-1}$, that is, the Raman ray peak position for graphite. The diamond-like carbon film 34 to be used for the present invention may show a Raman ray peak in the vicinity of the peak for diamond or the peak for graphite, and preferably in the vicinity of the peak for diamond.

Since this kind of diamond-like hard carbon film 34 has a very high Vickers hardness of 2000 to 5000 $kg/mm^2$, the diamond-like hard carbon film 34 is hardly worn when it slides on the movable valve body 20.

Further, a diamond-like carbon film containing silicon and at least one metal selected from the group consisting of zirconium, tungsten and titanium in its amorphous carbon film may also be used as the diamond-like hard carbon film 34 to be used in the present invention. By using the film containing silicon and at least one metal selected from the group consisting of zirconium, tungsten and titanium as described above, residual stress in the film can be reduced, so that the film can have a higher junction force. Therefore, the diamond-like hard carbon film 34 can have a higher force of adhesion to the intermediate layer 33, and can also have a high Vickers hardness of 5500 $kg/mm^2$ or more. The above-mentioned diamond-like hard carbon film 34 containing silicon and at least one metal element mentioned above differs from the diamond-like carbon film 34 described above, and it shows a Raman ray peak in the vicinity of a wavenumber of 1480 $cm^{-1}$ when measured by a Raman Spectroscopic Analyzer.

It is necessary that the total thickness t of the diamond-like hard carbon film 34 and the intermediate 33 should be 3.0 µm or less. If the total thickness t is more than 3.0 µm, it is difficult to form a layer having a uniform thickness at the region for the sliding contact surface 31, and the sliding contact surface 31 of the diamond-like hard carbon film 34 can not have smoothness. Therefore, the surface cannot have a desired center-line surface roughness (Ra), so that water leakage from between the sliding surfaces may be caused as will be described later.

For this reason, the appropriate thickness $t_1$ of the diamond-like hard carbon film 34 is in the range of 0.3 to 2.7 µm on the basis of the thickness $t_4$ of the above-mentioned intermediate layer 33.

This can be explained as follows. If the thickness $t_1$ of the diamond-like hard carbon film 34 is less than 0.3 µm, the carbon film 34 is worn in a short period of time due to the sliding on the movable valve body 20, even though the carbon film 34 has a high hardness. On the other hand, if the film thickness $t_1$ is larger than 2.7 μm, the ununiformity of the thickness becomes large, so that the carbon film 34 having a uniform thickness cannot be coated.

Thin film forming methods, such as the PVD and CVD methods, that is, the sputtering method, the ion plating method and the like, can be used to form the diamond-like hard carbon film 34 and the intermediate layer 33 on the surface 35 of the stationary valve body 30.

To perform deposition by the plasma CVD method capable of forming a film at a low temperature, for example, a source gas and a carrier gas for forming films are supplied into a chamber, and voltage is applied between a cathode on which the stationary valve body 30 is disposed and an anode. Electrons derived from the cathode are collided with the source gas and the carrier gas to generate plasma, and the source gas component in the plasma is deposited on the surface 35 of the stationary valve body 30. The source gas and the carrier gas to be supplied to the chamber are then replaced, and the Ti film 33a, the Si film 33b and the diamond-like hard carbon film 34 are deposited in this order on the surface 35 of the stationary valve body 30. Thus, film formation is completed.

TABLE 1 shows source gasses and carrier gasses that can be used for the deposition of the respective films.

TABLE 1

| Film material | Source gas | Carrier gas |
| --- | --- | --- |
| Titanium (Ti) film | $TiCl_4$ | $H_2$, Ar |
| Silicon (Si) film | $SiCl_4$ or $SiH_2Cl_2$ | $H_2$ |
| Diamond-like carbon film | $C_6H_6$ | $H_2$, Ar |
| Diamond-like hard carbon film | $C_6H_6$, $SiCl_4$, ($ZrCl_4$, $TiCl_4$, $WF_6$) | $H_2$ Ar |

On the other hand, as mentioned above, the stationary valve body 30 to be coated with the diamond-like hard carbon film 34 and the intermediate layer 33 is required to be formed of ceramics.

In other words, if the stationary valve body 30 is formed of resin, the valve body 30 cannot be coated with the diamond-like hard carbon film 34. Furthermore, if the valve at body 30 is formed of metal, the valve body 30 is deformed by the pressure from the movable valve body 20, since the stationary valve body 30 formed of metal is lower in hardness than that formed of ceramics. Consequently, the diamond-like hard carbon film 34 formed on the surface 35 of the valve body 30 may be damaged.

On the other hand, the stationary valve body 30 formed of ceramics is not deformed by the pressure from the movable valve body 20, since ceramics is high in hardness. Therefore, the diamond-like hard carbon film 34 formed on the surface 35 is not damaged. Furthermore, since ceramics can be processed at high accuracy, the surface 35 of the stationary valve body 30 can be finished to have a smooth surface. Consequently, the diamond-like hard carbon film 34 formed on the surface 35 can have a smooth and flat surface in accordance with the surface 35 of the stationary valve body 30.

Ceramics comprising mainly alumina, zirconia, silicon nitride, silicon carbide or aluminum nitride may be used as the ceramics for forming the stationary valve body 30. Since these kinds of ceramics have a Young's modulus of 200 to 445 GPa and a Vickers hardness (Hv) of 10 GPa or more, the sliding contact surface 31 is not deformed even when the pressure from the movable valve body 20 is increased. In addition, these kinds of ceramics are highly resistant to chemicals. For these reasons, faucet valves made of the ceramics can be used for an extended period of time.

These kinds of ceramics can be produced as described below. Alumina ceramics can be obtained by adding one or more kinds of sintering aids selected from $SiO_2$, MgO, CaO and the like to $Al_2O_3$ used as the main material, and firing the mixture at a temperature of 1600° to 1750° C. Zirconia ceramics can be obtained by adding one or more kinds of stabilizers selected from $Y_2O_3$, CaO, MgO, $CeO_2$ and the like to $ZrO_2$ used as the main material, and firing the mixture at a temperature of 1100° to 1400° C. Silicon nitride ceramics can be obtained by adding one or more kinds of sintering aids selected from oxides or nitrides of elements categorized as the 2a and 3a groups in the periodic table to $Si_3N_4$ used as the main material, and firing the mixture at a temperature of 1800° to 1900° C. under an atmosphere of an inert gas. The silicon carbide ceramics can be obtained by adding a sintering aid, such as C, B, $Al_2O_3$, $Y_2O_3$ or the like, to SiC used as the main material, and firing the mixture at a temperature of 1800° to 2000° C. under an atmosphere of an inert gas. Furthermore, the aluminum nitride ceramics can be obtained by adding one or more kinds of sintering aids selected from oxides of rare earth elements, such as $Y_2O_3$ and $Yb_2O_3$, to AlN used as the main material, and firing the mixture at a temperature of 1700° to 1900° C. Thus, the ceramics excellent in strength, toughness and wear resistance can be obtained.

Just as in the case of the stationary valve body 30, the movable valve body 20 can be made of ceramics. However, since the stationary valve body 30 is coated with the diamond-like hard carbon film 34 having an excellent self-lubrication characteristic, the movable valve body 20 can be made of a material, such as a resin and a metal, having a hardness lower than that of ceramics. If the hardness of the resin or metal is too low, the sliding contact surface 21 is deformed by the pressure from the stationary valve body 30, so that there is a fear of causing water leakage and also a stick-slip phenomenon. To solve these problems, a resin having a Rockwell hardness of 100 or more, such as polyamideimide (PAI) and polyimide (PI), can be used when the movable valve body 20 is made of a resin. When the movable valve body 20 is made of a metal, it is possible to use brass, stainless steel or cemented carbide.

Figure 2:
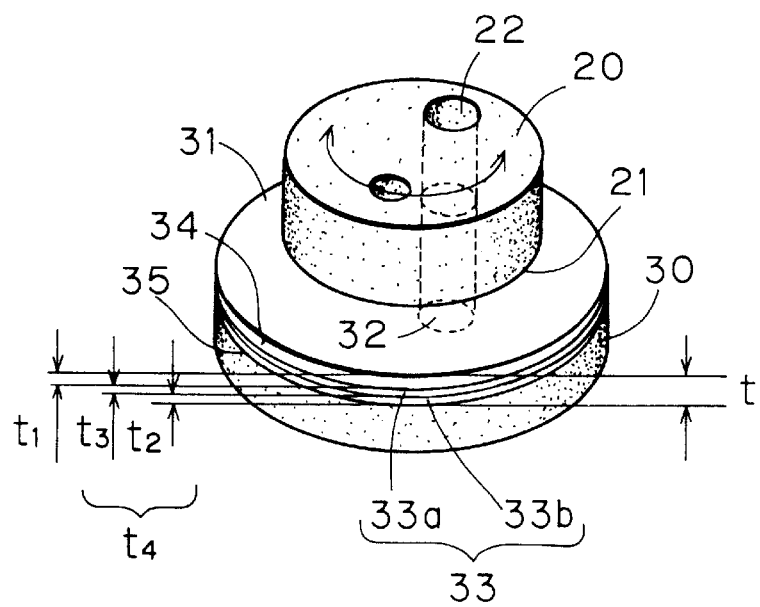
FIG. 2 is a perspective view showing the valve bodies of a faucet valve taken as an example of a disc valve in accordance with the present invention.

FIG. 2 shows a faucet valve to which a disc valve in accordance with the present invention is applied. The faucet valve is frequently used for water faucets and water/hot-water faucets. A movable valve body 20 and a stationary valve body 30 are disc-shaped and provided with a liquid passage 22 penetrating therethrough so that the valve bodies 20 and 30 can communicate with each other. As described above, the stationary valve body 30 is made of ceramics, and the ceramic surface is provided with a sliding contact surface 31 on which a diamond-like hard carbon film 34 is formed through an intermediate layer 33. The movable valve body 20, that is, the other one of the valve bodies, is made of a resin, ceramics or metal. The flat, smooth sliding contact surface 21 is faced to the sliding contact surface 31 of the stationary valve body 30. The liquid passage 22 is opened or closed as the movable valve body 20 is rotated.

In this kind of faucet valve, the sliding contact surface 31 of the stationary valve body 30 is formed by using the above-mentioned intermediate layer 33 and the diamond-like hard carbon film 34.

Between the sliding contact surfaces 21 and 31 of the movable valve body 20 and the stationary valve body 30, it is required that sliding is performed easily without using lubricants and that water leakage is not caused.

If the sliding contact surfaces 21, 31 of the valve bodies 20, 30 of the faucet valve are too rough, water leakage may occur from between the sliding contact surfaces 21, 31. In particular, when the faucet valve is provided with a water purifier, large water pressure is applied between the valve bodies 20, 30, so that there is more possibility of causing water leakage.

To solve this problem, the center-line average roughness (Ra) of the sliding contact surface 21 of the movable valve body 20 is set at 0.2 μm or less, preferably 0.1 μm or less. The flatness of the sliding contact surface 21 is set at 1 μm or less. The center-line average roughness (Ra) of the surface 35 of the stationary valve body 30 coated with the diamond-like hard carbon film 34 is set at 0.12 μm or less, preferably 0.05 μm or less. The flatness of the surface 35 is set at 1 μm or less. These flatness and average roughness values can be attained by setting the total thickness t of the intermediate layer 33 and the diamond-like hard carbon film 34 at 3.0 μm or less as described above.

The liquid passages 22, 32 provided in the two valve bodies 20, 30 can be opened or closed by sliding and contacting the sliding contact surfaces 21, 31 each other while the movable valve body 20 and the stationary valve body 30 are in a non-lubrication condition, and by moving the movable valve body 20 in the direction indicated by the arrow. By this open/close operation, the flowrate of a liquid to be supplied is controlled.

Since the sliding contact surface 31 of the stationary valve body 30 is coated with the diamond-like hard carbon film 34 which has an excellent a self-lubrication characteristic and a high hardness, smooth sliding can be effected with a low lever operation force without significant wear of the movable valve body 20, in spite of non-lubrication condition.

In the example of the faucet valve shown in FIG. 2, the surface 35 of the stationary valve body 30 is coated with the diamond-like hard carbon film 34 through the intermediate layer 33 comprising the Ti film 33a and the Si film 33b laminated in this order. Alternatively, the movable valve body 20 may be made of ceramics, and the surface thereof may be coated with the diamond-like hard carbon film 34 through the above-mentioned intermediate layer 33. Furthermore, both the valve bodies 20, 30 may be made of ceramics, and each of the surfaces thereof may be coated with the diamond-like hard carbon film 34 through the intermediate layer 33 comprising the Ti film 33a and the Si film 33b.

A faucet valve was taken as an example in the above description of the embodiment of the present invention. However, the disc valve of the present invention can also be used for medical sampling valves and chemical liquid valves as a matter of course. Furthermore, it is needless to say that the disc valve of the present invention can be applied to ball valves and other valve members, or various sliding members, such as mechanical seals and bearings.

Experiment example 1:

An alumina substrate was prepared, which was coated with a diamond-like hard carbon film 44 through an intermediate layer 43 comprising a Ti film and a Si film laminated in this order just as in the case of the present invention. In addition, an alumina substrate coated with a diamond-like hard carbon film through an intermediate layer comprising a SiC film, and an alumina substrate directly coated with a diamond-like hard carbon film were prepared as comparative examples. These examples were measured in terms of adhesion strength by using a scratch tester (full scale: 300 mN).

In this experiment, the surface roughness of each alumina substrate was set at 0.06 μm in the center-line average roughness (Ra), and the thickness $t_1$ of the diamond-like hard carbon film was set at 0.8 μm. The thickness $t_2$ of the Ti film and the thickness $t_3$ of the Si film each were set at 0.2 μm (the two films constitute the intermediate layer of the alumina substrate in accordance with the present invention). The thickness of the SiC film constituting the intermediate layer of the alumina substrates of the comparative examples was set at 0.4 μm.

Figure 3:
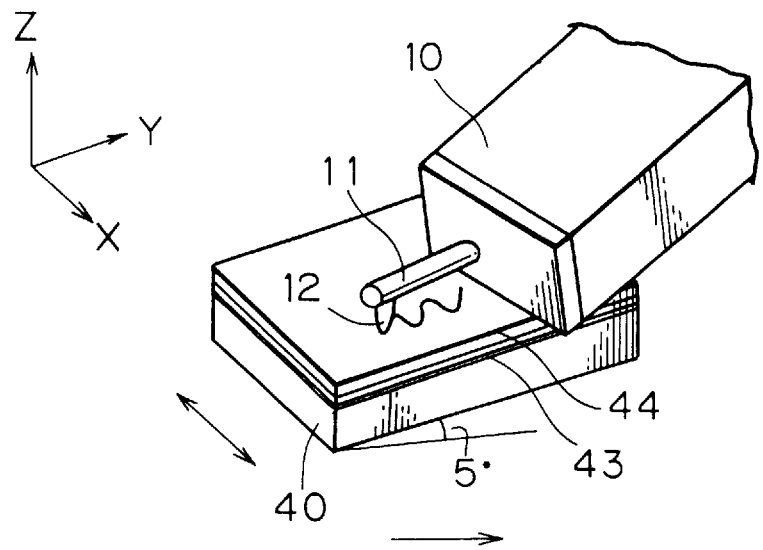
FIG. 3 is a schematic view showing a scratch test conducted by using a scratch tester.

As schematically shown in FIG. 3, a scratch tester comprises a cartridge 10, a lever 11 extending from the tip of the cartridge 10 and a pressing piece 12 provided on the lever 11. The pressing piece 12 was pressed against the diamond-like hard carbon film 44 of a sample inclined 5° in the direction of Z, the cartridge 10 was moved in the direction of Y while being oscillated in the direction of X. Then, a load was measured which was reached when the film peeled while the pressing force was being applied.

TABLE 2 shows the results for all the samples.

TABLE 2

| | Load at the time of peeling (mN) | | |
|---|---|---|---|
| | Present invention | Comparative examples | |
| Sample No. | Intermediate layer (Ti film, Si film) | No intermediate layer | Intermediate layer (SiC film) |
| 1 | ≧300 mN | ≧98.6 mN | ≧186.8 mN |
| 2 | ≧300 mN | ≧105.2 mN | ≧190.5 mN |
| 3 | ≧300 mN | ≧106.8 mN | ≧180.0 mN |
| 4 | ≧300 mN | ≧109.5 mN | ≧185.6 mN |
| 5 | ≧300 mN | ≧103.7 mN | ≧184.6 mN |
| 6 | ≧300 mN | ≧105.1 mN | ≧183.5 mN |
| 7 | ≧300 mN | ≧106.5 mN | ≧185.5 mN |
| 8 | ≧300 mN | ≧104.1 mN | ≧184.3 mN |
| 9 | ≧300 mN | ≧102.3 mN | ≧189.3 mN |
| 10 | ≧300 mN | ≧106.3 mN | ≧187.5 mN |
| Average | ≧300 mN | ≧104.8 mN | ≧185.5 mN |

According to the results, in the alumina substrate of the comparative example, which is directly coated with the diamond-like hard carbon film, the film was peeled at an average load of about 104.8 mN. In the alumina substrate coated with the diamond-like hard carbon film through the intermediate layer comprising a SiC film, the film was peeled at an average load of about 185.5 mN.

In the case of the alumina substrate of the present invention coated with the diamond-like hard carbon film through the intermediate layer comprising the Ti film and the Si film, the diamond-like hard carbon film was not peeled even when a pressing force of 300 mN or more was applied. It was confirmed that the diamond-like hard carbon film was adhered firmly.

Furthermore, the thickness $t_2$ of the Ti film and the thickness $t_3$ of the Si film (the two films constitute the intermediate layer of the alumina substrate in accordance with the present invention) were changed, and the adhesion strength was measured in the same procedure as conducted in Experiment example 1. The surface roughness of the alumina substrate was set at 0.06 μm in terms of the center-line average roughness (Ra), and the film thickness $t_1$ of the diamond-like hard carbon film was set at 0.8 μm. The samples having an adhesion strength of 300 mN or more were marked ○ and the samples having an adhesion strength of less than 300 mN were marked X, when measured by a scratch tester (full-scale: 300 mN).

TABLE 3 shows the results of the measurement.

TABLE 3

| Thickness of Ti film ($t_2$: μm) | Thickness of Si film ($t_3$: μm) | | | | | |
|---|---|---|---|---|---|---|
| | 0.2 | 0.3 | 0.4 | 0.5 | 0.6 | 0.7 |
| 0.2 | O | O | O | O | O | X |
| 0.3 | O | O | O | O | X | X |
| 0.4 | O | O | O | X | X | X |
| 0.5 | O | O | X | X | X | X |
| 0.6 | O | X | X | X | X | X |
| 0.7 | X | X | X | X | X | X |

Consequently, when the total thickness $t_4$ of the intermediate layer was 0.8 μm or less, high adhesion strength was obtained, and the diamond-like hard carbon film was not peeled even if the pressing force is 300 mN or more.

Experiment 2:

Next, a faucet valve shown in FIG. 2 was made as a trial product. The sealing performance of the surface was measured which was found when the roughness of the surface 35 of the stationary valve body 30 to be coated with the diamond-like hard carbon film was changed.

The present experiment used a faucet valve comprising a disc-like movable valve body 20 having an outer diameter of 30 mm and a thickness of 15 mm and provided with a liquid passage 22 having a diameter of 5 mm, and a disc-like stationary valve body 30 having an outer diameter of 40 mm and a thickness of 5 mm and provided with a liquid passage 32 having a diameter of 5 mm. The surface 35 of the stationary valve body 30 was coated with a diamond-like hard carbon film 34 through an intermediate layer 33 comprising a Ti film 33a and a Si film 33b laminated in this order so as to form a sliding contact surface 31. The flatness and the center-line average roughness of the sliding contact surface 21 of the movable valve body 20 were set at 1 μm and 0.1 μm, respectively. The thickness $t_1$ of the Ti film 33a, the thickness $t_2$ of the Si film 33b and the thickness $t_3$ of the diamond-like hard carbon film 34 were set at 0.2 μm, 0.2 μm and 0.8 μm, respectively (the surface 35 of the stationary valve body 30 was to be coated with these films).

The stationary valve body 30 was made of alumina ceramics comprising 96% pure alumina and sintering aids (0.5 weight % MgO, 0.5 weight % CaO and 5.0 weight % $SiO_2$). The movable valve body 20 was made of alumina ceramics comprising 91% pure alumina, 3.0 weight % $TiO_2$ in addition to the above-mentioned sintering aids so as to have higher resistance against thermal shock, because the movable valve body 20 had a larger thickness than the stationary valve body 30.

The sealing performance of the valve was measured by counting the number of bubbles generated from between the sliding contact surfaces 21, 31 in the following condition. That is, the movable valve body 20 was pressed down onto the stationary valve body 30 with an axial force of 30 kgf and both valves were submerged in water in this condition, and an air pressure of 5.5 kg/cm² was applied to the liquid passages 22, 32 for one minute, and then the bubbles from between the sliding contact surfaces 21, 31 were counted.

TABLE 4 shows the results of the measurement.

TABLE 4

| Surface roughness of stationary valve body (Ra: μm) | Number of bubbles generated (pieces/min) |
|---|---|
| 0.24 | 124 |
| 0.15 | 69 |
| 0.13 | 13 |
| 0.12 | 0 |
| 0.11 | 0 |
| 0.06 | 0 |
| 0.02 | 0 |

As a result, in the samples wherein the center-line average roughness (Ra) of the surface 35 of the stationary valve body 30 was more than 0.12 μm, bubbles were generated from between the sliding contact surfaces 21, 31.

In the case of the samples wherein the center-line average roughness (Ra) of the surface 35 of the stationary valve body 30 was 0.12 μm or less, the number of bubbles to be generated from between the sliding contact surfaces 21, 31 was zero.

From these reasons, it is found that water leakage can be prevented by setting the center-line average roughness (Ra) of the surface 35 of the stationary valve body 30 at 0.12 μm or less.

Experiment 3:

Furthermore, in order to check for operability, a faucet valve shown in FIG. 2 provided with a diamond-like hard carbon film 34 having a thickness $t_1$ of 0.8 μm was made as a trial product, and a sliding test was conducted.

The stationary valve body 30 and the movable valve body 20, having been pushed to each other at an axial force of 30 kgf, were included in a valve unit. A load cell was provided on an operation lever (not shown) for sliding the movable valve body 20. A load required to move the operation lever was measured from the above-mentioned load cell when hot water having a temperature of 80° C. was injected into the liquid passages 22, 32 of the valve bodies 20, 30 at a pressure of 1 kg/cm².

Figure 4:
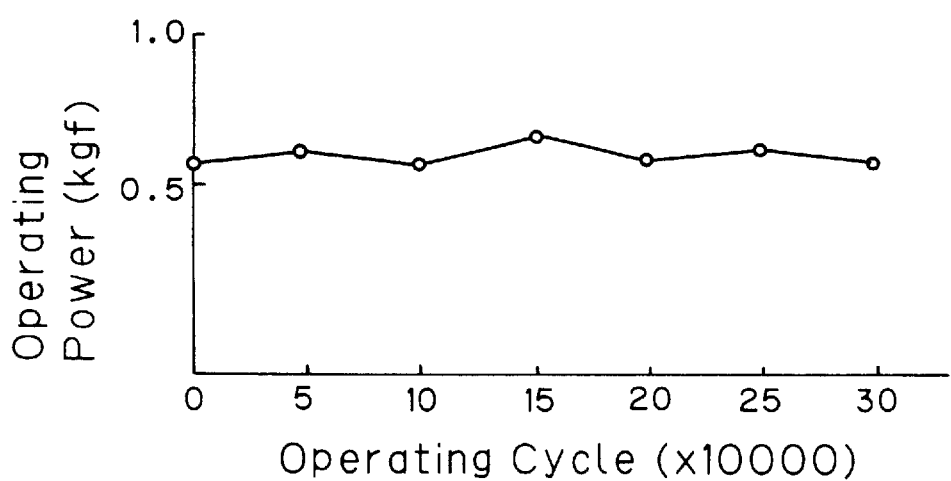
FIG. 4 is a graph showing a relationship between lever operation force and the number of sliding during open/close operation of a faucet valve in accordance with an embodiment of the present invention.

FIG. 4 shows the results of the measurement.

As a result, since the surface of the stationary valve body 30 was coated with the diamond-like hard carbon film 34, smooth sliding was effected by applying a force of about 0.6 kgf because of the excellent self-lubrication characteristic of the diamond-like hard carbon film 34, when sliding was conducted between the stationary valve body 30 and the movable valve body 20 made of alumina ceramics. What is more, the excellent characteristic remained almost unchanged during 300000 times of sliding operations.

As described above, the disc valve of the present invention comprises two valve bodies which slide with each other, wherein at least one of the valve bodies is made of ceramics, and the surface of the valve body is coated with a diamond-like hard carbon film constituting a sliding contact surface through an intermediate layer comprising a Ti film and a Si film laminated in this order. In this structure, because of the excellent self-lubrication characteristic of the diamond-like hard carbon film, the disc valve can maintain a stable sliding characteristic for an extended period of time without causing linking in spite of sliding in a non-lubrication condition. Furthermore, even when the sliding contact surface of the valve body is a smooth surface, a high adhesion force can be obtained between the sliding surface and the diamond-like hard carbon film. Accordingly, excellent sealing performance can be obtained. Consequently, the present invention can provide a highly reliable disc valve without causing any water leakage even if it is applied to water faucets and water/hot-water faucets equipped with water purifiers.

I claim:

1. A disc valve comprising two valve bodies which slide with each other, characterized in that at least one of the valve bodies is made of ceramics, and a diamond-like hard carbon film is formed on the surface of said ceramics through an intermediate layer comprising a Ti film and a Si film formed in this order, and the surface of said diamond-like hard carbon film is used as a sliding contact surface.

2. A disc valve in accordance with claim 1, wherein said Ti film and said Si film each have a thickness of 0.15 µm or more, and the total of the thickness of the Ti film and the thickness of the Si film is 0.8 µm or less.

3. A disc valve in accordance with claim 1, wherein the thickness of said diamond-like hard carbon film is in a range of 0.3 to 2.7 µm.

4. A disc valve in accordance with claim 1, wherein said ceramics is alumina ceramics.

5. A disc valve in accordance with claim 1, wherein said diamond-like hard carbon film shows Raman ray peaks in the vicinities of wavenumbers of 1333 $cm^{-1}$ and 1550 $cm^{-1}$ in Raman spectroscopic analysis.

6. A disc valve in accordance with claim 1, wherein said diamond-like hard carbon film comprises silicon and at least one of metals selected from the group consisting of zirconium, tungsten and titanium, and shows a Raman ray peak in the vicinity of a wavenumber of 1480 $cm^{-1}$ in Raman spectroscopic analysis.

\* \* \* \* \*